April 17, 1934.  S. G. HICKOX  1,955,295
LIP STICK HOLDER
Filed Sept. 2, 1932

INVENTOR
Sherman G. Hickox
BY
ATTORNEYS

Patented Apr. 17, 1934

1,955,295

UNITED STATES PATENT OFFICE 1,955,295

LIP STICK HOLDER

Sherman G. Hickox, Waterbury, Conn., assignor to Scovill Manufacturing Company, Waterbury, Conn., a corporation of Connecticut Application September 2, 1932, Serial No. 631,449

4 Claims. (Cl. 206—56)

This invention relates to lipstick holders.

It is an object of the invention to provide a simple and economical lipstick holder which fully encloses the lipstick when not in use and in which the lipstick is projected and withdrawn by a simple thumb movement.

It is a further object of the invention to provide such a lipstick holder in which the movement of the thumb in projecting the lipstick automatically releases latching means for a cap.

With these general objects in view the invention consists in the features, combinations, details of construction and arrangements of parts which will first be described in connection with the accompanying drawing and then more particularly pointed out.

In the drawing:—

Figure 1:
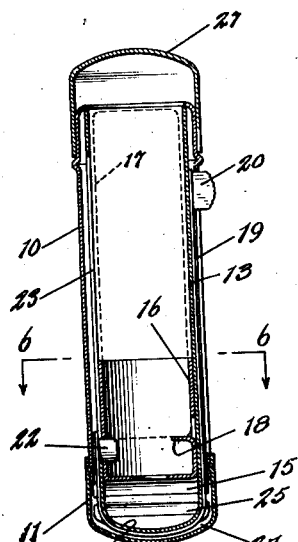
Figure 1 is a sectional view of a lipstick holder constructed in accordance with the invention, the section being taken on line 1—1 of Figure 4.
Figure 2:
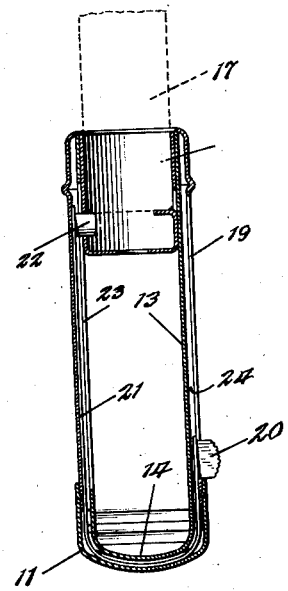
Figure 2 is a similar view, showing a different position of the parts, i. e. with the lipstick projected.
Figure 3:
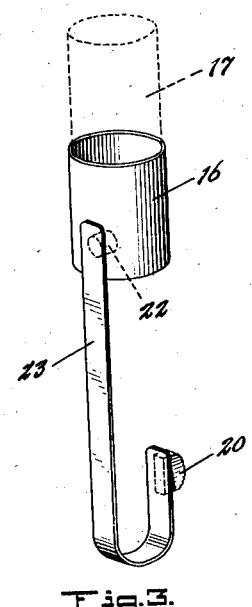
Figure 3 is a perspective view of some of the parts removed.
Figure 4:
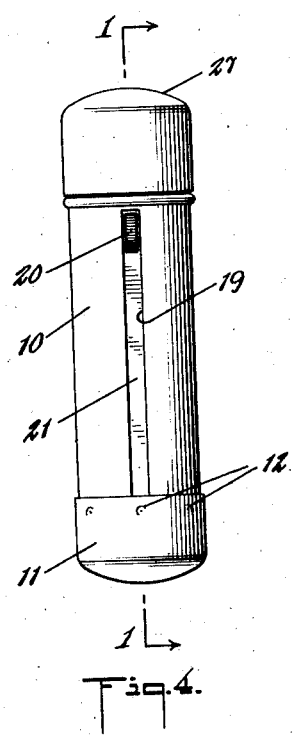
Figure 4 is an elevational view of the lipstick holder in closed position.

Referring to the drawing, there is provided a casing or housing and in constructions embodying the invention to what is now considered the best advantage the casing is double-walled to form an intervening space U-shaped in vertical section. In the exemplification here illustrated, the casing comprises an outer tubular casing member 10 having a cup-shaped bottom closure member 11 permanently secured in place by punched in portions 12. Within this outer casing is an inner casing member 13 having a cup-shaped bottom portion 14. These two casing members are spaced apart to provide a channel 24 that is U-shaped in vertical section and which is hereinafter referred to.

To hold the inner and outer casing members against relative movement, the top rim of the outer casing member is turned in over the rim of the inner casing member, as appears in Figure 1, and a bead 15 on the inner casing member underlies the bottom edge of tubular element 10.

Slidably mounted in the casing is a carrier 16 for holding a lipstick or other cosmetic pencil 17. This carrier has a tongue 18 cut out from its wall and bent inwardly to anchor the lipstick in place.

There is provided means for moving the carrier up and down in the casing by a simple thumb movement. To this end, as here shown as an example, movable in a slot 19 in the outer casing element 10 is a thumb-piece 20. This thumb-piece is secured to one end of a flexible actuating strip 21, the other end of which has a pin 22 which takes into a suitable hole in the carrier 16. The inner casing element has a slot 23 for the passage of pin 22. The flexible strip 21 thus connects the thumb-piece with the lipstick carrier so that when the thumb-piece is moved downwardly from the position of Figure 1, the carrier is advanced to project the lipstick for use. Similarly, reverse movement of the thumb-piece withdraws the lipstick into the casing.

Figure 5:
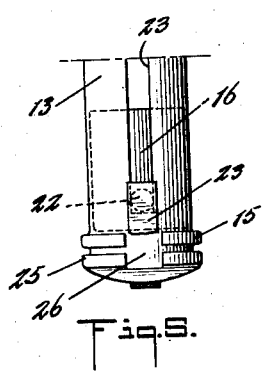
Figure 5 is an explanatory view showing the inner casing member in elevation with parts broken away.

The invention in its entirety includes means for guiding the flexible strip. In the embodiment here shown as an example, channel 24 between the inner and outer casing members constitutes a U-shaped guideway for the strip that effects the reverse bend in the strip as the latter is moved one way or the other. To keep the strip in a straight path, i. e. to prevent side slip, the inner casing member 13 has two beads 15, 25 near its lower end. At diametrically opposed points, these beads are cut away (Figure 5) to form grooves 26 in which the strip rides. In other words, the cut or disrupted ends of the beads form opposing shoulders which confine the flexible strip laterally.

Flexible strip 21 is wider than slot 19 so that when the thumb-piece is in the position of Figure 1 with the lipstick withdrawn, slot 19 is closed by the strip. When the thumb-piece is down, the slot is closed by the inner casing member. Slot 23 is at all times closed by the outer casing member.

Figure 7:
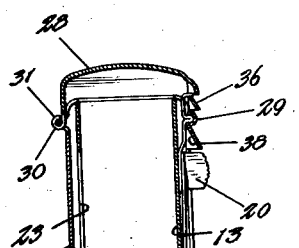
Figure 7 is a sectional view of a modified construction.
Figure 6:
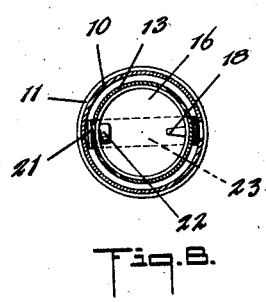
Figure 6 is a sectional view taken on the line 6—6 of Figure 1.

There is provided a removable top closure for the casing. Figure 1 illustrates a slip cap 27 and Figure 7 illustrates a hinged cap 28. In the latter embodiment, secured in a bead 29 on the outer casing member are the ends of a pintle wire 30. The upper edge of the casing and the bead are cut away to accommodate a lug 31 formed on the cap and wrapped around the pintle wire to constitute a hinge.

The invention in its entirety includes means for latching the hinged cover and means for automatically releasing said latching means upon movement of the thumb-piece to advance the lipstick. This may be accomplished by a catch on the cap and a displaceable latch secured to the actuating unit. In the embodiment illustrated as an example in Figures 7 and 8, secured to the end of flexible strip 21 adjacent the thumb-piece is a latch strip 34 of spring metal. The upper end of this latch strip is bent outwardly to form a latch 35 which hooks over a catch 36 in the skirt of the cap (Figure 7). The upper rim of the outer casing member is cut away to accommodate the latch and the rim of the inner casing member may be similarly cut away if desirable.

While the means for automatically releasing the latching means may vary in construction, this may conveniently be accomplished by exerting a cam action on the latch strip upon movement of thumb-piece. In the embodiment here illustrated as an example, latch strip 34 has a lug or projection 37 formed by a double fold in the strip material. In latching position, this lug takes into the interior of bead 29. When the thumb-piece is moved down to advance the lipstick, the engagement between lug 37 and the lower edge of bead 29 exerts a camming action that bends the latch strip 34 inwardly sufficiently to withdraw latch 35 from catch 36, thus releasing the catch. As soon as lug 37 has passed the edge of bead 29, latch strip 34 springs back to normal position by virtue of its inherent resiliency. Upon reverse movement of the thumb-piece, lug 37 engages a slanting cam surface 38 formed by the underside of a struck up portion of the outer casing just below bead 29 and merging into the lower edge of bead 29. This engagement displaces the latch strip inwardly until lug 37 passes the high point, i. e. the lower edge of bead 29. Thereupon, the latch strip springs back into normal position, lug 37 entering the bead.

Figure 8:
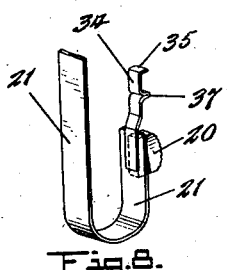
Figure 8 is a perspective view of parts of the same removed.

It is to be understood that except for the cap and latch, the holder of Figures 7 and 8 is the same in construction as the one first described.

In using the holder of Figures 7 and 8, the holder is grasped in the fingers and the thumb-piece moved down the slot. The first part of this movement releases the latch to free the hinged cap. Thereupon the cap may be fully opened by gravity or it may be flipped open by a slight wrist motion. Continued down movement of the thumb-piece advances the lipstick into a position for use. Thus, the holder is opened and the lipstick projected by a one-handed operation, leaving the other hand of the user free to hold a mirror, for example. After use, the lipstick is withdrawn into the casing by a reverse movement of the thumb-piece, the end of this movement placing the latch in latching position as described. Then the cap is replaced in position, the catch 36 snapping under latch 35.

In using the embodiment of Figure 1, the operation is the same except that there is no latch, the slip cap being removed prior to actuation of the thumb-piece. In this case also, the operation of advancing the lipstick is a one-handed one, once the cap is removed.

What is claimed is:

1. In a lipstick holder, and in combination, a casing, a carrier for a lipstick movable in said casing, actuating means for moving said carrier, a hinged cap for the casing, a catch on said cap, a spring strip connected with said actuating means, a latch element on said strip for engaging said catch to hold the cap closed, and means for causing said strip to be sprung out of latching position upon movement of the actuating means.

2. In a lipstick holder, and in combination, a casing, a carrier for the lipstick movable in said casing, means including a thumb-piece for moving said carrier, a hinged cap for the casing, a catch on said cap, a spring-strip connected with said thumb-piece, a latch element on said strip for engaging said catch to hold the cap closed, and cooperating elements on the strip and casing for causing said strip to be sprung out of latching position upon movement of said thumb piece.

3. In a lipstick holder, and in combination, a casing, a carrier for a lipstick longitudinally movable in said casing, a flexible band in the casing having one end secured to said carrier, a thumb piece secured to the other end of the flexible strip and movable in a slot in the casing, a hinged cap for the casing, a catch on said cap, a latch element connected with the thumb-piece and engaging said catch to hold the cap closed, and means whereby said latch element is released upon movement of the thumb-piece to advance the carrier.

4. In a lipstick holder, and in combination, a cylindrical outer casing member, a cylindrical inner casing member, a carrier for a lipstick slidable in the inner casing, a flexible band movable in the space between said casing members, a connection between one end of the band and the carrier, the inner casing member having a slot for said connection, an actuating thumb-piece connected with the other end of said band, the outer casing member having a slot for said thumb-piece, said casing members having cup-shaped lower ends forming a U-shaped channel for causing flexing of the band in its movement, and spaced opposing shoulders on one of said casing members for confining said band laterally in a given path.

SHERMAN G. HICKOX.